July 3, 1951          J. R. MORRIS          2,559,366

APPARATUS FOR BREAKING SCORED GLASS SHEETS

Filed March 26, 1949          2 Sheets-Sheet 1

INVENTOR.
Joseph R. Morris
BY Nobbe & Swope
ATTORNEYS

July 3, 1951 J. R. MORRIS 2,559,366
APPARATUS FOR BREAKING SCORED GLASS SHEETS
Filed March 26, 1949 2 Sheets-Sheet 2
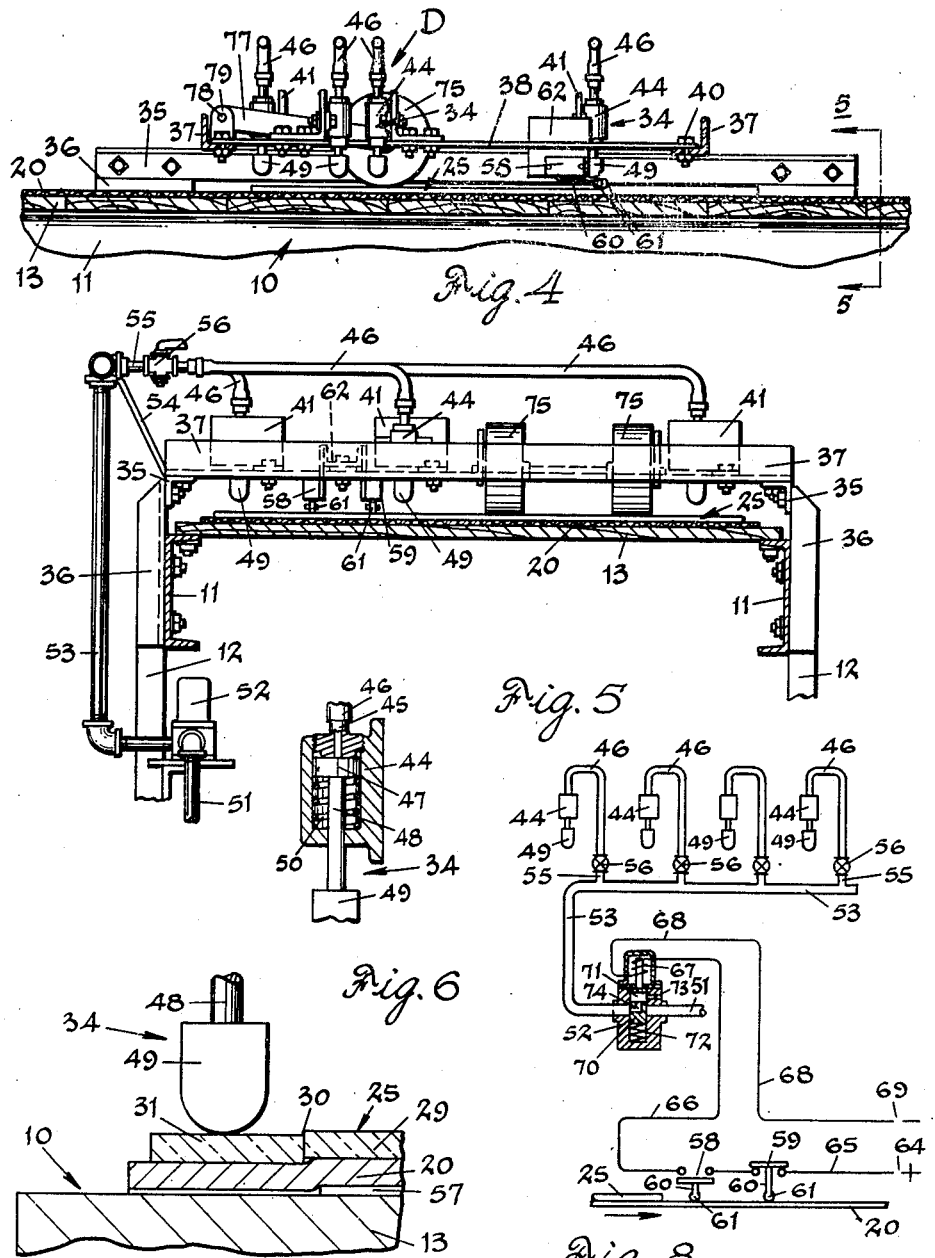

Patented July 3, 1951

2,559,366

UNITED STATES PATENT OFFICE 2,559,366

APPARATUS FOR BREAKING SCORED GLASS SHEETS

Joseph R. Morris, Toledo, Ohio, assignor to Libbey-Owens-Ford Glass Company, Toledo, Ohio, a corporation of Ohio Application March 26, 1949, Serial No. 83,605

2 Claims. (Cl. 49—48)

The present invention relates to the breaking of cut or scored glass sheets or plates, and more particularly to an improved apparatus for breaking a waste margin or margins from a plate of glass that has been template cut to a pattern of predetermined shape and size.

Briefly stated, the invention contemplates the breaking off of said waste margins from the pattern cut portion of the glass sheet, while the pattern cut portion is supported and the waste margins are relatively unsupported, by sharply impacting the waste margin preferably, although not necessarily, at a plurality of spaced points along its length.

An important object of the invention is to provide, in an apparatus for accomplishing the above purpose, an endless conveyor of deformable material upon which the scored sheets to be broken can be carried in a continuous manner over a support for the pattern cut portion of the sheet, and impacting means mounted above the support for striking the waste margin of the sheet, when it reaches a predetermined position over the support, to break the waste marginal portion from the pattern cut portion.

Another object is the provision of a pattern lifting device associated with the conveyor, beyond the supporting and breaking means, for lifting the pattern cut portion of the sheet from the waste marginal portion to permit the former to be grasped by an operator.

Another object is to provide, in apparatus of the above character, air operated striking devices, for impacting the waste margin to break it from the scored sheet.

Another object is the provision of means for actuating the striking members at a predetermined time, together with means for controlling the extent and duration of the impact on the glass.

Still another object is to provide means for supporting the striking devices above the support for the pattern cut portion of the glass sheet, and for adjusting the position of said devices to break different sizes and shapes of pattern cuts.

Other objects and advantages of the invention will become more apparent during the course of the following description, when taken in connection with the accompanying drawings.

In the drawings, wherein like numerals are employed to designate like parts throughout the same:

Fig. 4 is a vertical sectional view taken substantially on the line 4—4 in Fig. 3;

Fig. 5 is a transverse vertical section taken substantially on the line 5—5 in Fig. 4;

Fig. 6 is a fragmentary sectional view through one of the striking devices, taken substantially on the line 6—6 in Fig. 3;

Fig. 7 is an enlarged fragmentary view showing the breaking action of one of the striking devices; and Fig. 8 is a diagrammatic presentation of the combined pneumatic and electrical systems employed in operating and controlling the striking devices.

Figure 1:
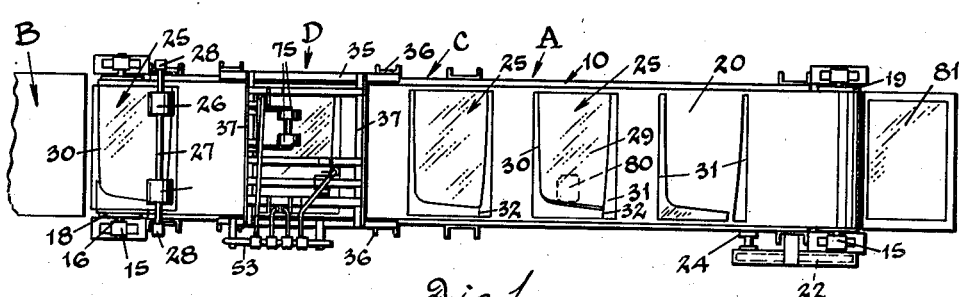
Fig. 1 is a plan view of a breaking table constructed in accordance with my invention, located at the end or side of a conventional template cutting table, and showing the impacting means in position.
Figure 2:
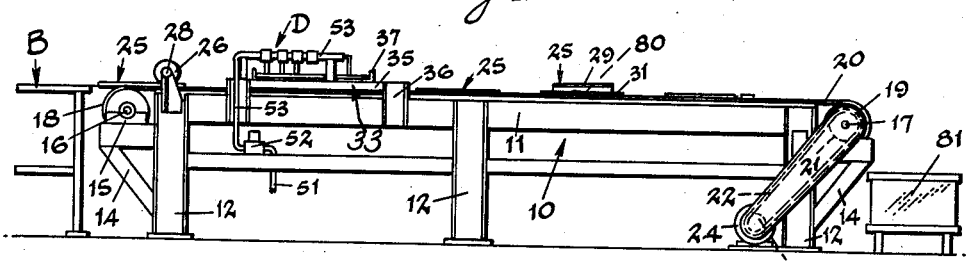
Fig. 2 is a side elevation of the apparatus shown in Fig. 1.

Referring now more particularly to the drawings, there has been illustrated therein a preferred form of the breaking apparatus of my invention, designated in its entirety by the letter A and which, as shown in Figs. 1 and 2, may be associated with the discharge end or side of a conventional template cutting machine B.

As here shown, the breaking apparatus includes broadly a supporting means C and an impacting means D, mounted above the supporting means. The supporting means C may be in the form of a skeletal framework 10, comprising longitudinally extending channel irons 11 carried at the upper ends of vertical members 12, and a stationary table top 13 extending between and bolted to the tops of the channel irons 11. Carried at opposite ends of the framework 10 are brackets 14, supporting bearings 15 within which are journaled the opposite ends of horizontal shafts 16 and 17 upon which are mounted drums 18 and 19 respectively. An endless belt 20, of deformable material, such as canvas or the like, is trained about the drums 18 and 19 to run over the stationary table top 13.

This endless belt 20 forms the movable table upon which scored glass sheets are received from the template cutting machine B and continuously moved to and away from the impacting and breaking means D. In order to drive the movable table or belt 20 for this purpose, a sprocket 21 is keyed to the shaft 17 of the drum 19, and a chain 22 runs from the sprocket 21 to a sprocket 23 on the drive shaft of a motor 24 mounted on the floor.

Glass sheets 25 to be pattern cut and broken are first scored on the template cutting machine B and then ejected, or otherwise moved, therefrom onto the moving table 20. In order to reduce the speed of the incoming scored sheet, when it has been rapidly ejected from the template cutting machine, to prevent objectionable twisting of the sheet, and to assist in accurately positioning it for breaking on the moving table 20, there is provided a pair of resilient rolls 26, mounted on a shaft 27 which is journaled in bearings 28 at opposite sides of the table top 13. These rolls 26 are positioned to engage the surface of the plate to insure its traveling in a straight line, and at the speed of the movable table 20 toward the impacting means D.

As explained above, the waste margins of cut patterns of practically any size and shape, can be broken with this breaking apparatus, by proper adjustment of the striking means. For example, patterns formed by a score line completely surrounding them, or patterns formed by a score line which enters the sheet at one point along the edge thereof and leaves by another, can be broken with equal facility. By way of illustration, there has been shown in the drawings one type of pattern 29 that is generally used in producing halves of two-piece automobile windshields.

Figure 3:
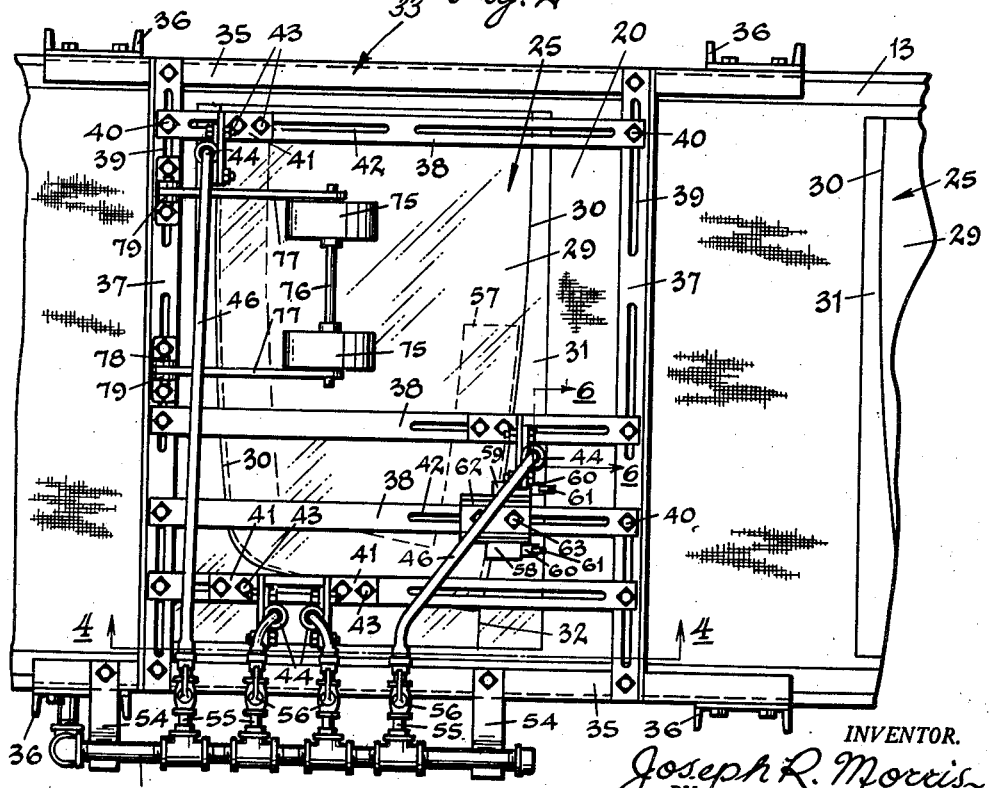
Fig. 3 is an enlarged plan view of the impacting means shown in Fig. 1.

As best seen in Figs. 1 and 3, this pattern 29 is generally rectangular in shape being formed by a score line 30 which enters from an edge at a short side of the light 25, runs along an adjacent long side, across the opposite short side and then along the other long side, to leave the light at a point spaced from but at the same edge as it entered. This type of cut leaves a generally U-shaped waste margin 31 and, to facilitate breaking thereof, one or more entering cuts may be made, as shown at 32, if desired.

The impacting means D comprises generally a frame 33 and a plurality of striking devices 34 carried by the frame (Figs. 1 to 5). The frame 33 is made up of a pair of longitudinally extending angle irons 35 mounted at opposite sides of the table frame 10 upon the upper ends of short channel irons 36 extending upwardly from the side channels 11, and a pair of cross angle irons 37 extending transversely between and bolted to the angle irons 35.

In order to support the striking devices 34 in proper operative position above the table top 13, there are provided a plurality of flat bars 38 which are adapted to be supported at their opposite ends on the horizontal legs of the angle irons 37; and in order to permit lateral adjustment of these bars above the table, the horizontal legs of the angle irons 37 are slotted as at 39 to receive the bolt and nut connections 40 for the bars 38.

The striking devices 34 are carried by brackets 41 which are bolted through slots 42 in the bars 38 by nut and bolt assemblies 43 to permit adjustment of the devices along their respective bars.

Each of the striking devices 34 (Figs. 4 to 6) comprises an air cylinder 44, carried by the bracket 41, and having a hose connection 45 in the top thereof that is adapted to be connected to an air hose 46 through which compressed air can be introduced into the cylinder. Mounted to reciprocate within the cylinder 44 is a piston 47, having a piston rod 48 extending downwardly through a packing gland in the bottom wall of the cylinder 44, and carrying on its lower end a striker 49 of resilient material, for impacting the glass to break off the waste margin when compressed air is introduced into the upper end of the cylinder. Also mounted within the cylinder, in surrounding relation to the piston rod 48, is a compression spring 50 which is adapted to force the piston upwardly and retract the striker 49 when the air pressure is released from the top of the piston.

Air is supplied to the cylinders 44 from an air storage tank (not shown) through pipe 51 to a conventional type of solenoid operated air valve 52 which may be attached to the table in any suitable manner; for example, as shown in Fig. 5. A manifold pipe 53 leads from the air valve 52 and runs along the side and slightly above the table where it is supported on brackets 54 bolted to one of the angle irons 35.

Leading off from suitable connections in the manifold pipe 53 are branch pipes 55, each of which is connected through a hand valve 56 with one of the hoses 46 connected to the cylinders 44 of the striking devices 34. As already indicated, the solenoid operated valve 52 is of the conventional type in which, upon energization of the solenoid, the pipes 51 and 53 will be placed in communication to feed compressed air from the source of supply to the cylinders 44, and, upon deenergizing the solenoid, the pipe 51 will be closed off and the pipe 53 will be opened to the atmosphere.

By reason of the slots 39 and 41 in the angle irons 37 and bars 38 respectively, the bars can be adjusted transversely of the table top 13 along the angle irons 37, and the brackets 41 can be adjusted longitudinally of the table along said bars, to position the striking devices 34 in a location where they can impact the waste margins 31 of the glass sheet 25 at the desired points when the sheet reaches a predetermined position above the stationary table 13.

To illustrate, in breaking out a cut pattern of the shape shown in the drawings, it has been found that best results will be obtained by positioning four striking devices in substantially the locations above the sheet shown in Fig. 3, when the sheet is in breaking position. Thus, it will be seen that if these four strikers 34 are operated one of them will impact the waste margin at the leading edge of the sheet and to one side of the transverse center line thereof. Another will impact the waste margin at the following edge of the sheet, adjacent the side edge of the sheet that is on the opposite side of the transverse center line from the first point of impact; and two strikers will impact the waste margin at closely spaced points at the opposite side edge of the sheet near the corner closest to the following edge.

As indicated above, in order to render the impact method of breaking of this invention most effective, it is desirable to have the body or pattern portion of the glass sheet supported, and the waste marginal portion substantially unsupported. For this purpose a pad 57 (Figs. 3 and 7) may be secured to the top of the stationary table 13, and below the belt or moving table 20 at the breaking position. For the particular pattern shape shown in the drawings, a substantially U-shaped pad having one leg thereof shorter than the other is preferred.

When the scored glass sheet reaches breaking position and is therefore properly indexed over the pad, as shown in Fig. 3, it will be found that, as best shown in Fig. 7, the pattern portion of the sheet is supported by the pad 57 and belt 20 while the waste margin of the sheet, due to the flexibility of the belt, is substantially unsupported. This permits sufficient flexing of the waste margin, under impact of the striker 49, to break it cleanly from the pattern shape.

It will be seen that in a case where the scored glass sheet can be held stationary in the breaking position, it is only necessary to properly position the glass and strikers relative to the pad or other support in order to obtain accurate and clean breaks upon operation of the impacting means.

However, when the glass sheet is moved continuously up to and through the breaking position as is the case when the belt 20 is continuously operated, it becomes necessary to control the operation of the strikers so as to provide a substantially instantaneous impacting of the waste margin at the exact instant that the scored glass sheet reaches the breaking position.

To this end, there is provided here a pair of limit switches 58 and 59, having switch arms 60 carrying rollers 61 which are adapted to normally run on the belt, and to also run on the glass sheet after engagement by the leading edge of the sheet to actuate the switch mechanism. The switches 58 and 59 are carried on a bracket 62 which is adjustably mounted on one of the bars 38 by bolt and nut connections 63 passing through the slot 39 in the bar. These switches should be so positioned along the said bar that the roller 61 of the switch 58 will be engaged by the leading edge of the glass sheet at the precise instant that the sheet reaches the breaking position and is properly indexed over the pad 57. The roller 61 of the switch 59 is positioned a very slight distance beyond the roller of switch 58 so that the switch 59 acts as an interrupter switch, in a manner to be hereinafter explained.

The operation of the impactor means 34 by the switches 58 and 59 can be best understood by reference to the combined pneumatic and electrical system diagram shown in Fig. 8. As shown therein, the leading edge of a scored glass sheet 25 being carried along by the belt 20 will close the normally open switch 58 at the instant the sheet reaches breaking position. Closing of the switch will permit current to flow from the positive main line 64 through wire 65, normally closed switch 59, switch 58 and wire 66 to the coil 67 of the solenoid operated valve 52 and then out through wire 68 to the negative side 69 of the main line. Energization of the solenoid will draw the piston 70 downwardly to place the pipe 52 in communication with the supply pipe 51 through the passageway 71, thus feeding compressed air to the cylinders 44 of the impacting devices 34 to cause the strikers 49 to impact the waste margins of the glass sheet. Immediately thereafter the leading edge of the moving glass sheet 25 will engage the roller 61 of the limit switch 59 to open this switch and break the circuit to the solenoid operated valve 52. Upon deenergization of the solenoid, the compression spring 72 in the valve 52 will become effective to move the piston 70 upwardly into full line position thus closing off the supply pipe 51 and placing the pipe 52 in communication with the atmosphere through passage ways 71, 73, and 74.

While the rollers 61 of the switches 58 and 59 remain on the moving sheet 25 no current will pass from wire 65 to wire 66, and as the following edge of the sheet passes the roller 61 of the switch 58, this roller will drop, to open the switch before the following edge of the sheet passes the roller 61 of the switch 59 to close this switch.

While the switches 58 and 59 are shown as spaced an appreciable distance apart in Fig. 8, for purposes of clarity, the switch 59 should actually be only very slightly in advance of switch 58, as shown in Fig. 3. In this way the actuation of switch 58 to operate the valve 52 and force compressed air into the cylinders 44 causing the strikers 49 to impact the glass, will be followed immediately by the actuation of switch 59 to release valve shutting off the air supply and opening the cylinders to the atmosphere to permit the springs 50 of the cylinders to retract the strikers.

In other words, the impact of the strikers on the glass is practically instantaneous, although the length of impact can be controlled by adjusting the switches 58 and 59 toward or away from one another.

In order to steady the glass sheet during the breaking operation, a pair of hold down rolls 75 may be provided to engage the central area of the glass when it is in breaking position (Fig. 3). These rolls may be rotatably carried on a shaft 76 journaled in links 77, the links being pivotally mounted on one of the angle irons 37 by pins 78 passing through suitable brackets 79 carried by the angle iron.

In operation, a sheet of glass is first scored in the desired manner either by hand or by an automatic template cutting machine on the template cutting table B. The scored sheet is then ejected, or otherwise moved, from the table B onto the moving belt 20 where it will be engaged by the rollers 26 to properly align the sheet for breaking and to insure its moving into breaking position at the linear speed of the belt. As the sheet 25 continues to move forwardly it passes beneath the impacting means D and successively engages the switches 58 and 59 at the instant that it reaches breaking position above the pad 57 to cause the strikers 49 to break the waste margin from the cut pattern in the manner described above.

As the glass sheet 25 passes from beneath the impacting means D, the waste edge will have been broken from the cut pattern but the entire sheet will lie in the same plane on the belt which makes it difficult for an operator to remove the cut pattern from the waste margin.

To overcome this, a small pad 80 is secured to the stationary table 13 beneath the moving belt 20 and to one side of the longitudinal center line of the table. As the scored and broken sheet passes over this pad the cut pattern of the sheet will be raised slightly above the waste margin thus permitting an operator to easily grasp a margin of the cut pattern and remove it from the moving belt to a buck or other place of temporary storage. At the same time the waste margin, either in one piece, or in two or more pieces, depending on the number of entering cuts 32 that have been made, will continue to be carried forwardly by the moving belt until it drops into a cullet box 81 at the end of the table.

While the apparatus of this invention is especially well adapted for the difficult job of breaking out template cut patterns from glass sheets, it can also be used in breaking single, straight cut, or other waste marginal portions, by proper arrangement of the strikers which may be operated electrically or mechanically as well as by fluid pressure. Also, any number of strikers, or only a single striker, can be used, depending on the type of waste margin to be broken; and, where more than one striker is employed, they may be operated successively as well as simultaneously if desired. In addition, by means of the hand valves 56, the amount of compressed air forced into each of the cylinders 44 can be accurately controlled.

In fact, it is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for breaking a scored glass sheet, a support for the portion of said sheet lying to one side of the score line, and impacting means mounted above said support at the opposite side of the score line, said impacting means including at least one cylinder, a piston reciprocable within the cylinder, a piston rod carried by said piston, a striker of compressible material mounted at the end of said piston rod, means for introducing fluid under pressure into said cylinder to force said striker outwardly therefrom to strike the portion of said sheet lying at the opposite side of the score line with a sharp impact and break it from said first-mentioned portion, and means for retracting said striker from said glass.

2. In apparatus for breaking a glass sheet that has been scored to define a portion of predetermined size and shape and a waste marginal portion, a stationary table, a belt of flexible material trained over said table for carrying the glass sheet to be broken, a breaking support fixed on said table beneath said belt of substantially the same shape and slightly smaller than the first-mentioned portion of the glass sheet, impacting means mounted above said fixed support and outwardly thereof, said impacting means comprising a cylinder, a piston reciprocable within the cylinder, a piston rod carried by said piston, a striker of compressible material mounted at the end of said piston rod, means for driving said belt to carry said sheet over said fixed support, and means operable when said first-mentioned portion of the glass sheet is on and in alignment with said fixed support for introducing fluid into said cylinder to force said striker outwardly therefrom to strike the waste marginal portion of the glass sheet and break it from said first-mentioned portion.

JOSEPH R. MORRIS.

REFERENCES CITED

The following references are of record in the file of this patent:

UNITED STATES PATENTS

| Number | Name | Date |
|---|---|---|
| 791,827 | Semmer | June 6, 1905 |
| 1,220,201 | Danner | Mar. 27, 1917 |
| 1,324,219 | Waterloo | Dec. 9, 1919 |
| 2,259,765 | Morris | Oct. 21, 1941 |